No. 757,945. PATENTED APR. 19, 1904.
J. H. MILLER.
APPARATUS FOR PREPARING CEREAL FOOD PRODUCTS.
APPLICATION FILED JUNE 11, 1903.
NO MODEL. 2 SHEETS—SHEET 1.
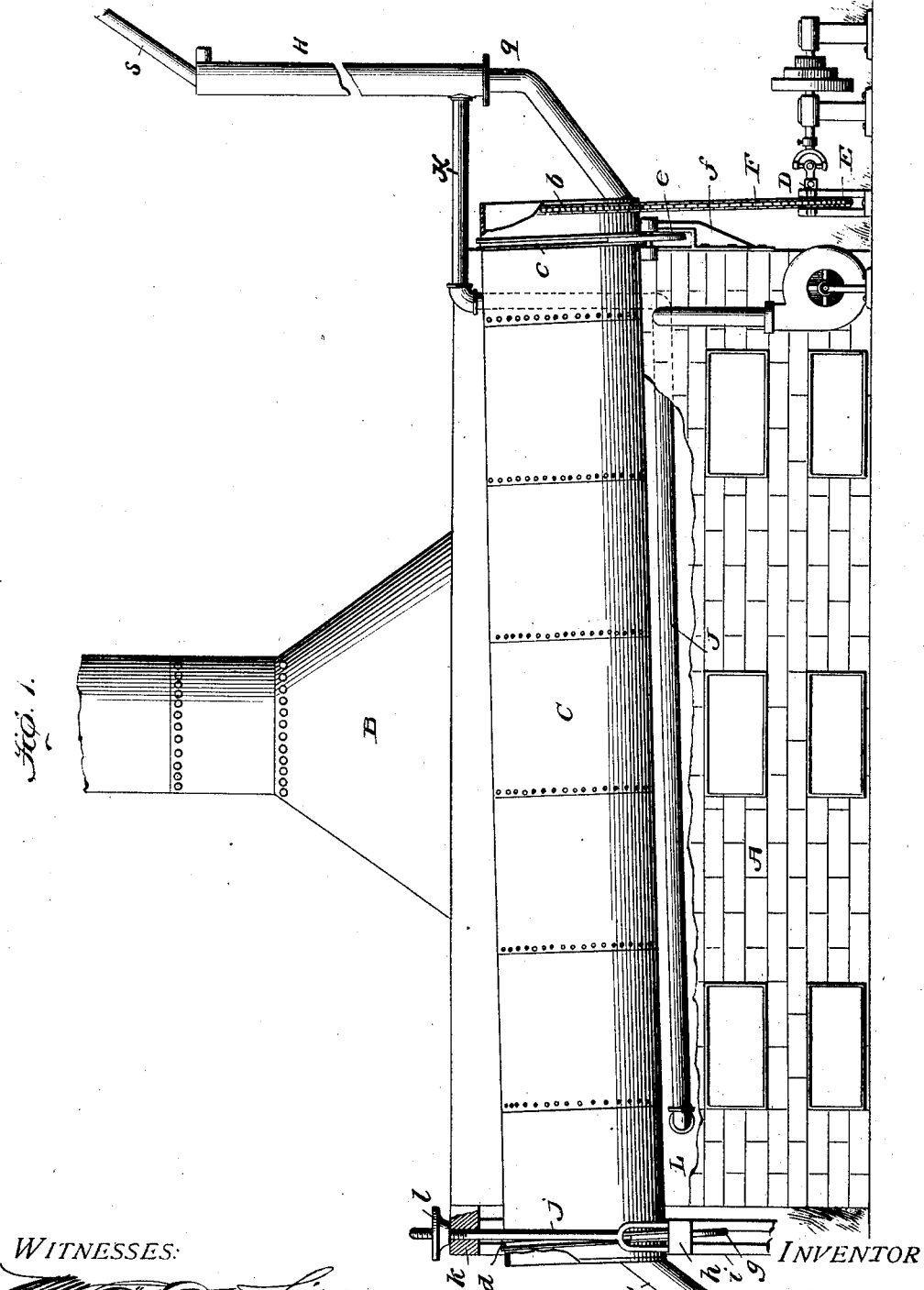

No. 757,945. PATENTED APR. 19, 1904.
J. H. MILLER.
APPARATUS FOR PREPARING CEREAL FOOD PRODUCTS.
APPLICATION FILED JUNE 11, 1903.
NO MODEL. 2 SHEETS—SHEET 2.
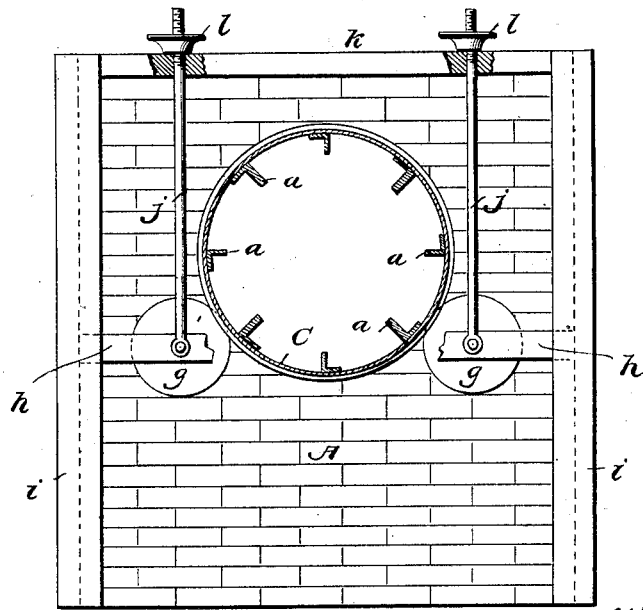
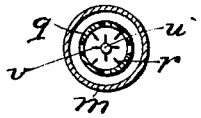
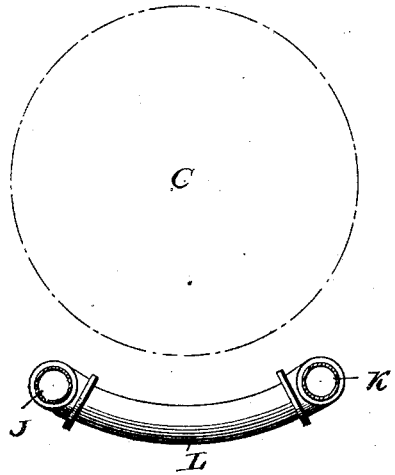
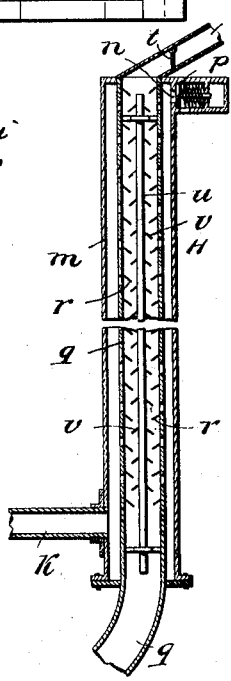
WITNESSES: INVENTOR
John H. Miller.
BY James J. Sheehy
Attorney No. 757,945. Patented April 19, 1904.

UNITED STATES PATENT OFFICE.

JOHN H. MILLER, OF SHARPSVILLE, PENNSYLVANIA.

APPARATUS FOR PREPARING CEREAL FOOD PRODUCTS.

SPECIFICATION forming part of Letters Patent No. 757,945, dated April 19, 1904.

Application filed June 11, 1903. Serial No. 161,066. (No model.)

*To all whom it may concern:*

Be it known that I, JOHN H. MILLER, a citizen of the United States, residing at Sharpsville, in the county of Mercer and State of Pennsylvania, have invented new and useful Improvements in Apparatus for Preparing Cereal Food Products, of which the following is a specification.

My invention pertains to apparatus for preparing cereal food products; and it aims to provide an improved cereal food product calculated to retain its flavor in and not be deteriorated by any climate and one which may be prepared for the table with but a minimum amount of cooking.

The invention is designed more particularly for the treatment of corn and will be fully understood from the following description and claims when taken in connection with the accompanying drawings, in which—

Figure 1 is a side view of the apparatus constituting the preferred embodiment of my invention, the said apparatus being shown with some of its elements partly broken away. Fig. 2 is a broken view of the forward end of the apparatus, with the rotary cylinder thereof in transverse section. Fig. 3 is a broken vertical section of the drier embraced in the apparatus; Fig. 4, a detail view illustrating the relative arrangement of the rotary cylinder and a pipe for supplying heated air to the drier. Fig. 5 is a cross-section of the drier.

Similar letters designate corresponding parts in all of the several views of the drawings, referring to which—

A is a furnace adapted to burn natural gas or other suitable fuel and having a chimney B, and C is a rotary cylinder, preferably of sheet metal, arranged longitudinally in the combustion-chamber of the furnace and extending through the end walls thereof. The said cylinder is open at its opposite ends, as shown in Fig. 1, to permit of the free escape of the moisture given off by corn and other cereals incident to the roasting thereof and is provided with internal longitudinally-disposed flanges $a$, Fig. 2, designed to raise and drop the cereal under preparation with a view of preventing burning or undue roasting thereof. The cylinder is also provided, as best shown in Fig. 1, with an annular sprocket-gear $b$, located at its rear or receiving end, an annular grooved band $c$, located adjacent to said end, and an annular grooved band $d$, located adjacent to its forward or discharge end. The band $c$ bears on antifriction-wheels $e$, loosely mounted in stationary bearings $f$, while the band $d$ bears on antifriction-wheels $g$, carried by a vertically-adjustable bar $h$, arranged and adapted to move in guide-bars $i$, Fig. 2. Connected to the bar $h$ are threaded rods $j$, which extend loosely through apertures in a crown-bar $k$ and are equipped above said bar with nuts or threaded hand-wheels $l$. By turning these hand-wheels the cylinder C may obviously be inclined to a greater or less extent to regulate the passage of cereal through the cylinder.

D, Fig. 1, is a shaft designed to be driven by a suitable motor and bearing a sprocket-wheel E, and F is a sprocket-belt, which is arranged on the wheel E and the sprocket-gear $b$ of the cylinder and has for its purpose to transmit rotary motion to the latter.

G, Fig. 1, is a chute arranged to convey cereal direct from the roasting-cylinder C to a grinding-mill, (not shown,) so as to assure the cereal being ground while in a heated state, and H, Figs. 1 and 3, is the drier of the apparatus. The said drier comprises an upright, preferably cylindrical, casing $m$, closed at its upper and lower ends and having a vent $n$ adjacent to its upper end, and a normally closed spring-backed valve $p$, controlling said vent, a tube $q$, arranged in the casing $m$ and extending through the upper and lower ends thereof and having a lower imperforate portion arranged to discharge directly into the rear end of the cylinder C and an upper foraminated portion and also having interior downwardly-inclined flanges $r$ at intervals of its height, a cereal-supply conduit $s$, communicating with the upper end of the tube $q$ and having a valve $t$, arranged to open under the weight of cereal and close subsequent to the passage of the cereal, so as to prevent the escape of heated air through the conduit $s$, and a central upright $u$, secured in the tube $q$ and having inclined flanges $v$, alternating with those of the tube.

The valve $p$, controlling the vent $n$, is designed to open under certain pressure and permit the escape of heated air from the drier, this with a view of preventing back pressure against the blower hereinafter described.

In Fig. 1 is the blower; J, a pipe connected with the blower and arranged longitudinally in the combustion-chamber of the furnace at one side of the longitudinal median line thereof; K, a pipe arranged longitudinally in the cumbustion-chamber of the furnace at the opposite side of the median line thereof with reference to pipe J and connected to the casing $m$ of the drier adjacent to the lower end of said casing, and L, Figs. 1 and 4, a transverse pipe arranged in the combustion-chamber of the furnace and connecting the forward ends of the pipes J and K.

It will be readily understood from the foregoing that when the furnace is in operation and the cylinder C and blower I are driven the cylinder will be highly and uniformly heated throughout, and air will be forced through the pipes J, L, and K into the casing $m$ and tube $q$ and will be highly heated *en route*. Now when cereal is fed to the tube $q$ through conduit $s$ it will take a tortuous course down through said tube, this because of the flanges $r$ $v$, and will pass from the tube into and through the cylinder C and from the latter, through the chute G, to the grinding-mill. Incident to the passage of the cereal through the tube $q$ it is thoroughly dried, while during its passage through the cylinder C it is roasted, after which it is conducted directly to the mill and while still in a heated state is reduced to meal, flour, or other product desired.

The cereal is fed to the drier H in its natural state—*i. e.*, with the outer coats on the kernels—and passes in such state through both the drier and the roasting-cylinder. This is materially advantageous, first, because the cereal is thoroughly dried and roasted without being robbed of any of its inherent qualities, and, second, because there is no liability of the product having a bitter unpalatable taste, as is the case when the outer coats of the kernels are removed precedent to drying and roasting the cereal.

The grinding of the cereal as it is delivered from the cylinder C and while it is still in a heated state insures the product having all of the qualities inherent in the cereal and improves the flavor of the product.

It will be appreciated from the foregoing that the product of my apparatus is partially cooked, and hence has a sweet palatable flavor and is not liable to ferment or otherwise deteriorate in any climate; also, that in virtue of the product being partially cooked but a minimum amount of cooking is necessary to prepare it for the table.

Having described my invention, what I claim, and desire to secure by Letters Patent, is—

1. An apparatus for the purpose described, comprising a furnace, a rotary cylinder, open at its opposite ends, arranged in the combustion-chamber of the furnace, and extending through opposite walls thereof, a drier arranged to discharge into the cylinder, at one end thereof, a blower, and a conduit connecting the blower and the drier, and extending through the combustion-chamber of the furnace.

2. In an apparatus for the purpose described, the combination with a drier comprising a casing, having a vent, and a spring-backed valve controlling the same, an upright, foraminated tube arranged in the casing, a conduit connected with the upper end of said tube, and having a valve arranged to open under the weight of cereal, and close subsequent to the passage of the cereal; of a blower, a conduit intermediate of the blower and the drier casing, and exterior means for heating said conduit.

In testimony whereof I have hereunto set my hand in presence of two subscribing witnesses.

JOHN H. MILLER.

Witnesses:
 WILLIS W. KITCH,
 CHAS. P. MOWER.